US012591522B2

(12) United States Patent
Ohtsuji

(10) Patent No.: US 12,591,522 B2
(45) Date of Patent: Mar. 31, 2026

(54) COMPUTER-READABLE RECORDING MEDIUM HAVING STORED THEREIN MEMORY ACCESS CONTROL PROGRAM, MEMORY ACCESS CONTROL METHOD, AND INFORMATION PROCESSING APPARATUS

(71) Applicant: Fujitsu Limited, Kawasaki (JP)

(72) Inventor: Hiroki Ohtsuji, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 18/801,911

(22) Filed: Aug. 13, 2024

(65) Prior Publication Data
US 2025/0086119 A1 Mar. 13, 2025

(30) Foreign Application Priority Data
Sep. 8, 2023 (JP) ................................. 2023-146411

(51) Int. Cl.
*G06F 12/1072* (2016.01)

(52) U.S. Cl.
CPC .... *G06F 12/1072* (2013.01); *G06F 2212/622* (2013.01)

(58) Field of Classification Search
None
See application file for complete search history.

(56) References Cited

U.S. PATENT DOCUMENTS

| | | | | |
|---|---|---|---|---|
| 7,484,043 B2 * | 1/2009 | Heller, Jr. | ........... | G06F 12/0824 718/104 |
| 10,970,213 B2 * | 4/2021 | McGee | ............... | G06F 12/0815 |
| 2002/0065991 A1 * | 5/2002 | Fortuna | ............... | G06F 12/0837 709/200 |
| 2008/0147988 A1 * | 6/2008 | Heller | ................. | G06F 12/0831 711/E12.001 |
| 2016/0328326 A1 | 11/2016 | Di Blas et al. | | |
| 2020/0349075 A1 | 11/2020 | Mcgee et al. | | |
| 2020/0379664 A1 * | 12/2020 | Mittal | ................... | G06F 3/0646 |
| 2021/0373951 A1 | 12/2021 | Malladi et al. | | |
| 2022/0050780 A1 * | 2/2022 | Passint | ............... | G06F 12/0815 |

FOREIGN PATENT DOCUMENTS

JP 2021-190121 A 12/2021

\* cited by examiner

*Primary Examiner* — Yaima Rigol
(74) *Attorney, Agent, or Firm* — Fujitsu Intellectual Property Center

(57) ABSTRACT
A computer-readable recording medium having stored therein a program causes one of processors to execute a process including: upon controlling an access from each of the processors to a shared memory including a storage area shared among the processors, determining the number of one or more first processors that can be controlled by hardware when the access is to be controlled by the hardware; and performing, based on a frequency of the access to the shared memory from the processors, a control of the access to the shared memory from a second processor, the number of one or more second processors being excluded the determined number of the first processors from the processors, by a first control being performed by software executed by the second processor, or by a second control being performed by the first processor according to a command issued by the second processor.

15 Claims, 13 Drawing Sheets

One Example of Processor Management Information    ↙13a

| Processor Number | Node Number | Application ID | Control Flag | Address and Size of Memory Area Used for RPC | Host IP Address |
|---|---|---|---|---|---|
| 0 | 0 | 1 | 1 | 0x1000, 1024 | 192.168.0.1 |
| 1 | 0 | 1 | 1 | 0x2000, 1024 | 192.168.0.2 |
| 0 | 1 | 1 | 0 | 0x1000, 1024 | 192.168.0.3 |
| 1 | 1 | 1 | 0 | 0x2000, 1024 | 192.168.0.4 |
| ... | ... | ... | ... | ... | ... |

Control Flag = 0: Software Control
Control Flag = 1: Hardware Control

FIG.6

One Example of Application
Management Information    ⬎ 13b

| Application ID | Address and Size of Shared Memory |
|---|---|
| 0 | 0x0000, 4096 |
| 1 | 0x8000, 4096 |
| ... | ... |

FIG.7

One Example of First Information for First Latency Estimation

~13c

| Number Of Processors under Hardware Control | Number of Processors under First Control | Number of Requests Per Sec. under Hardware Control | Number of Requests Per Sec. under First Control | Average Latency |
|---|---|---|---|---|
| 8 | 24 | 10000 | 10 | 250 |
| 6 | 26 | 8000 | 18 | 400 |
| 8 | 10 | 1000 | 8 | 200 |
| 8 | 24 | 10000 | 40 | 600 |
| ... | ... | ... | ... | ... |

FIG.8

One Example of Second Information for Second Latency Estimation

_~13d_

| Number Of Processors under Hardware Control | Number of Processors under Second Control | Number of Requests Per Sec. under Hardware Control | Number of Requests Per Sec. under Second Control | Average Latency |
|---|---|---|---|---|
| 8 | 16 | 1000 | 10 | 200 |
| 6 | 8 | 3000 | 14 | 300 |
| 8 | 10 | 4000 | 8 | 250 |
| 8 | 24 | 10000 | 40 | 1500 |
| ... | ... | ... | ... | ... |

FIG.9

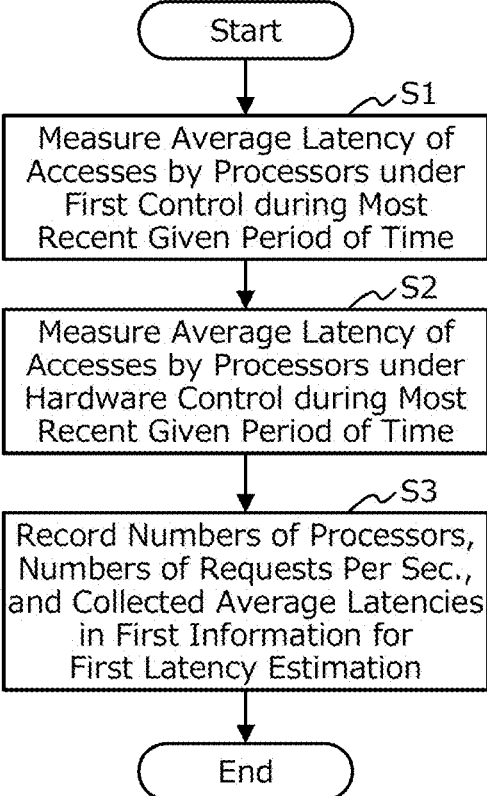

First Latency Monitoring

Start

S1

Measure Average Latency of Accesses by Processors under First Control during Most Recent Given Period of Time

S2

Measure Average Latency of Accesses by Processors under Hardware Control during Most Recent Given Period of Time

S3

Record Numbers of Processors, Numbers of Requests Per Sec., and Collected Average Latencies in First Information for First Latency Estimation End

FIG.10

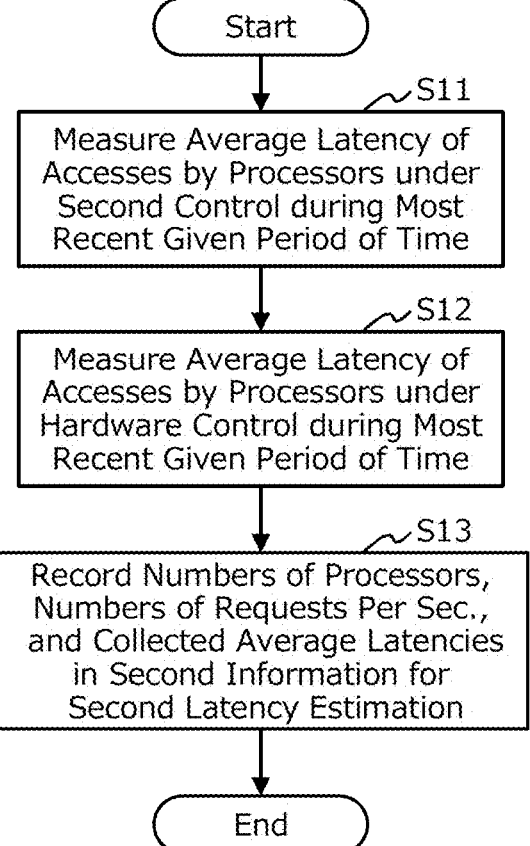

Second Latency Monitoring

Start

S11

Measure Average Latency of Accesses by Processors under Second Control during Most Recent Given Period of Time

S12

Measure Average Latency of Accesses by Processors under Hardware Control during Most Recent Given Period of Time

S13

Record Numbers of Processors, Numbers of Requests Per Sec., and Collected Average Latencies in Second Information for Second Latency Estimation End

Control Method Determination Process

Process When Application Count Is Changed

FIG.13

<u>Allocation Number Adjustment Process</u>

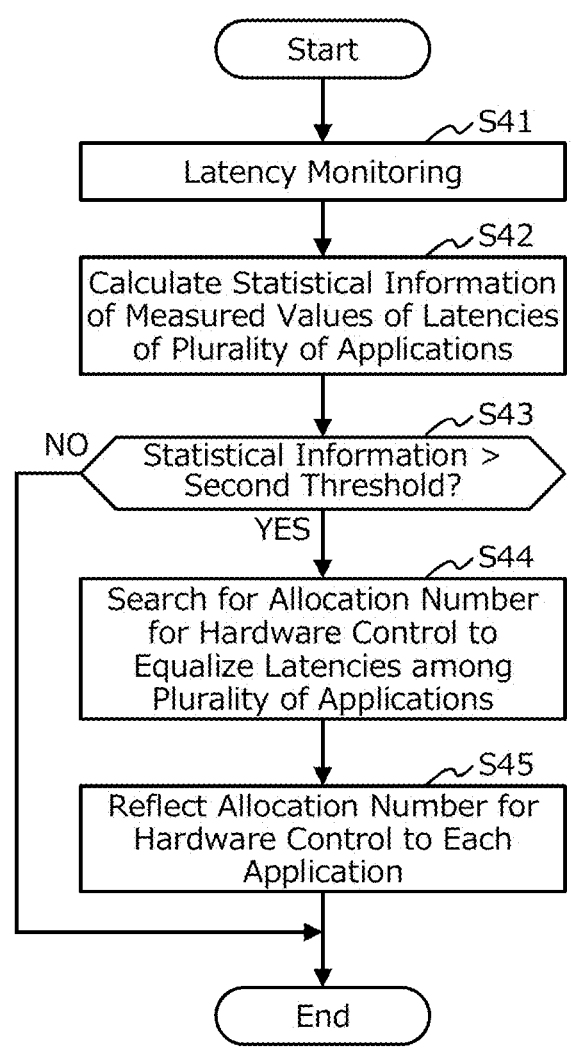

Start

↓ ~S41

Latency Monitoring

↓ ~S42

Calculate Statistical Information
of Measured Values of Latencies
of Plurality of Applications

↓ ~S43

NO ⟨ Statistical Information >
Second Threshold? ⟩

YES ↓ ~S44

Search for Allocation Number
for Hardware Control to
Equalize Latencies among
Plurality of Applications

↓ ~S45

Reflect Allocation Number for
Hardware Control to Each
Application

↓

End

COMPUTER-READABLE RECORDING MEDIUM HAVING STORED THEREIN MEMORY ACCESS CONTROL PROGRAM, MEMORY ACCESS CONTROL METHOD, AND INFORMATION PROCESSING APPARATUS

CROSS-REFERENCE TO RELATED APPLICATION

This application is based upon and claims the benefit of priority of the prior Japanese Patent Application No. 2023-146411, filed on Sep. 8, 2023, the entire contents of which are incorporated herein by reference.

FIELD

The present disclosure relates to a computer-readable recording medium having stored therein a memory access control program, a memory access control method, and an information processing apparatus.

BACKGROUND

Systems having a plurality of processors and a shared memory that includes a storage area shared among the plurality of processors are known.

Processors, such as Central Processing Units (CPUs), are provided with caches. Hence, when processors access a shared memory, access controls are performed to prevent inconsistency of data between the caches of the processors and the shared memory. Such controls include the consistency control (coherency control) to maintain consistency of the shared memory.

For example, consider the case where a processor #0 reads the value "0" from the memory address #0 of the shared memory and stores the value in the cache of the processor #0, and then the processor #1 changes the value at the memory address #0 to "1". In this case, the consistency control invalidates the value "0" at the memory address #0 stored in the cache of the processor #0.

Such a process is performed, for example, by hardware that handles the protocols for controlling consistency.

For example, a related art is disclosed in U.S. Patent Application Publication No. 2020/0349075.

SUMMARY

According to an aspect of the embodiments, a non-transitory computer-readable recording medium having stored therein a memory access control program causes one of a plurality of processors to execute a process including: upon controlling an access from each of the plurality of processors to a shared memory including a storage area shared among the plurality of processors, determining the number of one or more first processors that can be controlled by hardware when the access is to be controlled by the hardware; and performing, based on a frequency of the access to the shared memory from the plurality of processors, a control of the access to the shared memory from one or more second processors, the number of the one or more second processors being excluded the determined number of the one or more first processors from the plurality of processors, by a first control or a second control, the first control being performed by software executed by the second processor, and the second control being performed by the first processor according to a command issued by the second processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block diagram illustrating one example of the configuration of a system according to one embodiment;

FIG. 5 is a diagram illustrating one example of processor management information;

FIG. 6 is a diagram illustrating one example of application management information;

FIG. 7 is a diagram illustrating one example of first information for first latency estimation;

FIG. 8 is a diagram illustrating one example of second information for second latency estimation;

FIG. 9 is a flowchart illustrating an example of the operation of a first latency monitoring;

FIG. 10 is a flowchart illustrating an example of the operation of a second latency monitoring;

FIG. 13 is a flowchart illustrating an example of the operation of an allocation number adjustment process.

DESCRIPTION OF EMBODIMENT(S)

Figure 2:
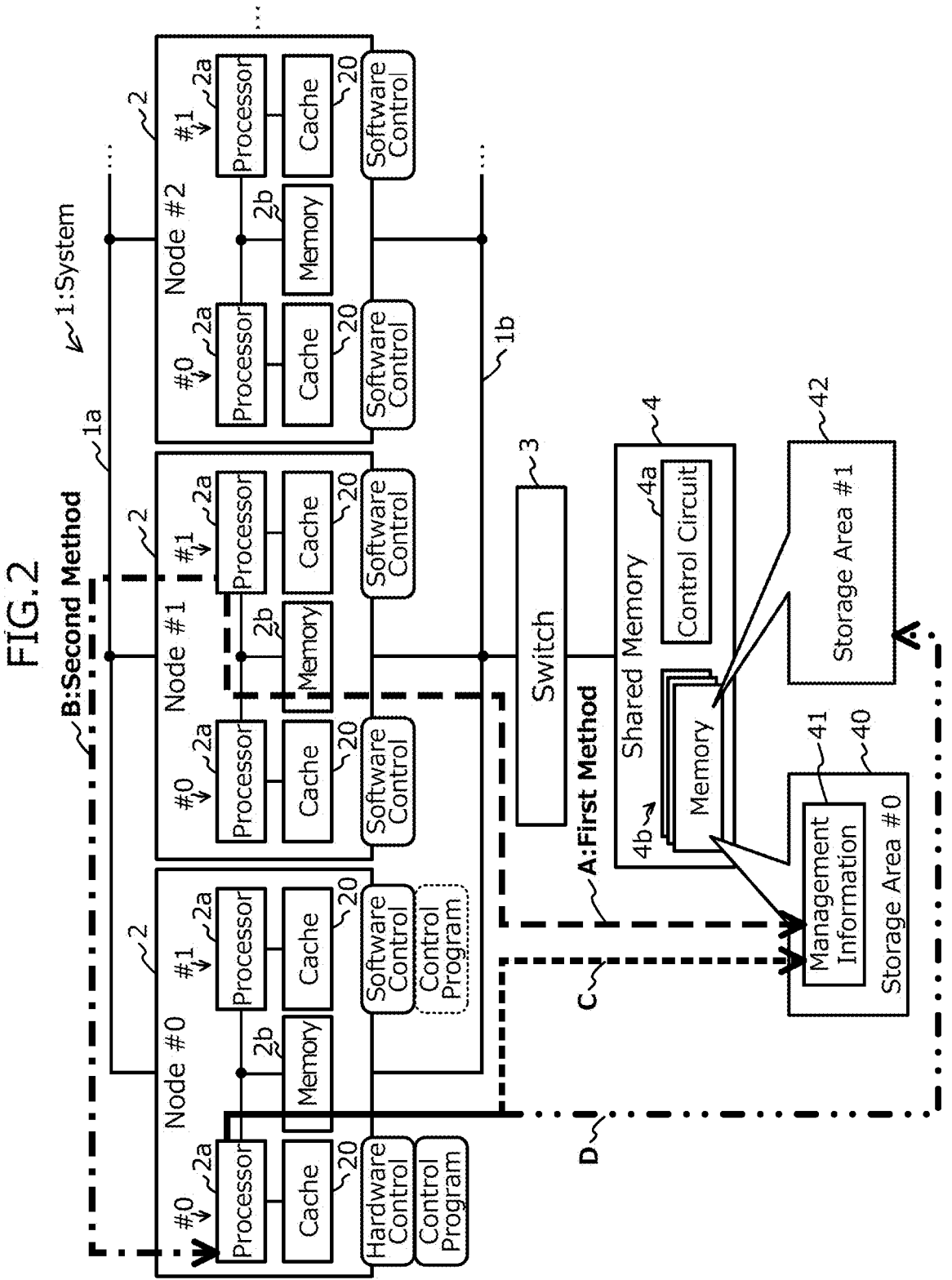
FIG. 2 is a diagram illustrating one example of the state of the consistency control on each of the plurality of processors illustrated in FIG. 1.

When the consistency control is performed by hardware, the number of processors that can be controlled for consistency may be limited, depending on the performance of the hardware or other factors.

To circumvent such a limit to connect all processors to the shared memory, it is also conceivable to execute the consistency control of accesses from all processors to the shared memory by software. In the coherence control by software, however, the software performs checking the cache states that are sequentially updated and interrelated to one another, which results in higher processing costs, for example, longer delay time (latency) caused by the coherence control, compared to the coherence control by hardware. As a result, the increased latency may lead to a large decrease in the performance of accesses to the shared memory from the plurality of processors.

Hereinafter, an embodiment of the present disclosure will be described with reference to the drawings. Note that the embodiment that is described is merely exemplary, and it is not intended to exclude various variations and applications of techniques that are not explicitly described below. For example, the present embodiment may be modified in various forms without departing from the scope thereof. In the drawings used in the following description, elements denoted by the like reference symbols denote the same or similar elements unless otherwise stated.

(A) Description of System According to One Embodiment

Figure 1:
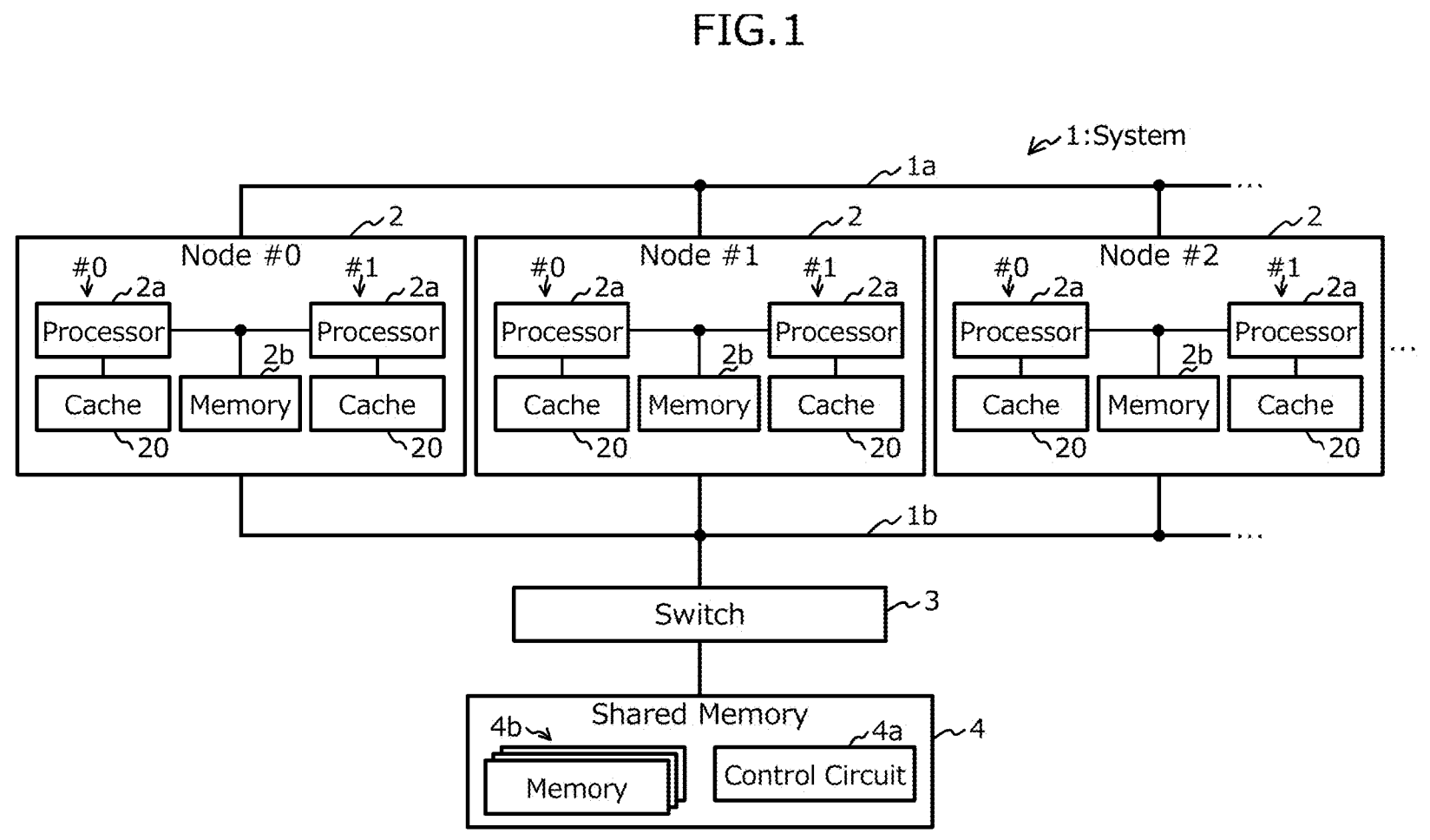

FIG. 1 is a block diagram illustrating one example of the configuration of a system 1 according to one embodiment. The system 1 includes, by way of example, a plurality of (e.g., m; m is an integer greater than or equal to 2) nodes 2, one or more (one in the example in FIG. 1) switches 3, and one or more (one in the example in FIG. 1) shared memories 4.

The nodes 2 (denoted as nodes #0 to #2 in FIG. 1; hereafter may be denoted as nodes #0 to #m−1) may each be a server, for example, and are examples of a computer or information processing apparatus. Each node 2 may include, for example, a plurality of (two in the example in FIG. 1) processors 2a, one or more (one in the example in FIG. 1) memories 2b, and a plurality of (two in the example in FIG. 1) caches 20.

Each processor 2a is one example of an arithmetic processing unit configured to perform a wide variety of controls and computations. The processors 2a are coupled to the memory 2b.

The memory 2b is one example of a main memory (main storage device) that stores information, such as a wide variety of data and programs. The memory 2b on the node 2 may be regarded as "local memory" for the processors 2a on that node 2.

Each cache 20 is one example of a cache memory having a storage area for storing a part of data (cache data) used for the execution of programs by the processors 2a. The cache 20 is, for example, a volatile memory such as a static random access memory (SRAM) that has a higher access speed than the memory 2b and the shared memory 4, for example, and examples thereof include an Ln (n is an integer greater than or equal to 1, for example, $1 \leq n \leq 3$) cache of the CPU. In other words, the caches 20 may be implemented in the processor 2a.

Each processor 2a and each cache 20 may be referred to as the processor #0 or #1 and the cache #0 or #1, respectively.

The plurality of nodes 2 may be communicatively connected to each other by a high-speed interconnect 1a. The interconnect 1a may include, for example, a high-speed transmission path, as well as a switch compliant with the communication standard of the transmission path. The transmission path may include, for example, a transmission path compliant with the communication standard such as Infini-Band, Myrinet, Ethernet®, or optical communication (e.g., Fibre Channel (FC)).

In addition, each of the plurality of nodes 2 and the switch 3 may be communicatively connected to each other by a high-speed interconnect 1b. The interconnect 1b may include, for example, a transmission path (fabric) compliant with the communication standard such as the Compute Express Link (CXL) or Peripheral Component Interconnect Express (PCIe). CXL is the communication standard based on PCIe.

The switch 3 relays communications (accesses) from each of the plurality of nodes 2 to the shared memory 4. For example, when the system 1 includes a plurality of shared memories 4s, the switch 3 may transmit a packet to the shared memory 4 to be accessed from a node 2. The switch 3 is a switch that is compliant with the communication standard of the transmission path, and may be a CXL switch when the shared memory 4 is a CXL shared memory, for example.

The shared memory 4 is one example of a memory for storing information, such as a wide variety of data and programs used in the plurality of nodes 2. One non-limiting example of the shared memory 4 is a CXL shared memory, which is compliant with the CXL or later standard (e.g., CXL 3.0).

The shared memory 4 may include, by way of example, a control circuit 4a, which is one example of hardware configured to perform the consistency control, and one or more memories 4b that embody a storage area in the shared memory 4. The memory 4b may be a memory module provided with a volatile memory chip such as a Dynamic Random Access Memory (DRAM), or a memory module provided with a non-volatile memory chip such as a Persistent Memory (PM), for example.

The control circuit 4a is one example of hardware configured to perform the consistency control. In one embodiment, it is assumed that the number of processors 2a for which the control circuit 4a can perform the consistency control is limited, in other words, the control circuit 4a can perform the consistency control only on a given number k of processors 2a among the plurality of processors 2a.

The given number k is the upper limit of the number of processors for which access controls can be performed by the hardware. Access controls may include, for example, consistency control on data in response to an access to the shared memory 4. The given number k is an integer less than 2 m, for example, when the number of processors 2a provided in the system 1 is 2 m.

In the following description, a processor 2a under the control of the consistency control by the control circuit 4a may be denoted as a "hardware-controlled" processor 2a or processor 2a "subjected to hardware control". On the other hand, a processor 2a that is not under the control of the consistency control by the control circuit 4a (not subjected to hardware control) may be denoted as a "software-controlled" processor 2a or processor 2a "subjected to the software control".

FIG. 2 is a diagram illustrating one example of the state of the consistency control on each of the plurality of processors 2a illustrated in FIG. 1. The example illustrated in FIG. 2 depicts the case where the processor #0 in the node #0 is hardware-controlled (denoted as "Hardware Control") and the processors #1 in the node #0 and the processors #0 and #1 in the nodes #1 and #2 are software-controlled (denoted as "Software Control").

Here, at least one processor 2a of the plurality of processors 2a may execute a control program (memory access control program) according to one embodiment. Although FIG. 2 illustrates an example in which the processor #0 in the node #0 under the hardware control executes the control program, this is not limiting and the control program may be executed by a processor 2a under the software control (the processor #1 in the node #0 in the example in FIG. 2).

Note that, similarly to other processors 2a in the system 1, the processor 2a that executes the control program may execute an application 11 (see FIG. 4), which is a task executed by the system 1 (nodes 2).

Based on the frequency of accesses to the shared memory 4 from each of the plurality of processors 2a, the control program controls switching of the methods of the consistency control on accesses by each processor 2a, between the hardware control and the software control, as well as controlling switching between methods for the software control.

For example, the control program determines the number of one or more first processors 2a that can be controlled by hardware when the hardware is made to control the accesses. The method for determining the number of processors subjected to the hardware control will be described later.

The control program designates one or more second processors 2a to be subjected to the software control, and causes the processors 2a subjected to the software control to execute either the first control or the second control. The number of the one or more second processors 2a being excluded the determined number of the one or more first processors 2a from the plurality of processors 2a.

(Example of First Control)

The first control is a method to perform the consistency control by software executed by the processor(s) 2a subjected to the software control. The first control includes, for example, the following first method, which performs the consistency control by software using management information 41 stored in the shared memory 4.

For example, in the first method, a plurality of processors 2a subjected to the software control use a storage area 40 (storage area #0) which is a part of a memory 4b in the shared memory 4 used for the consistency control between a storage area 42 (storage area #1) in the shared memory 4 and the caches 20. The storage area 42 is a storage area accessed by the processors 2a when applications are executed.

As illustrated in the reference symbol A in FIG. 2, each processor 2a subjected to the software control stores, via the interconnect 1b, various information used for the consistency control, e.g., information about the cache status, into management information 41 stored in the storage area 40. The information about the cache state includes an area within the storage area 42 of which data is held in the local cache 20 as read cache data and the presence or absence of write cache data in the local cache 20.

In addition, in the first method, at least one of the processors 2a under the hardware control (hereinafter for convenience, sometimes referred to as "representative processor") 2a performs a control according to the management information 41 as a part of the consistency control.

For example, as indicated by the reference symbol C in FIG. 2, when accessing the storage area 42 under the hardware control, the representative processor 2a refers to the management information 41 via the interconnect 1b to determine whether there is an access conflict in the storage area 42 to be accessed by the representative processor 2a. Determining whether there is an access conflict may include, for example, determining whether the area in the storage area 42 that the representative processor 2a attempts to access matches an area in the management information 41 recorded by a processor 2a subjected to the software control (such as the area in which data is updated on the cache 20).

If there is no access conflict, in other words, if there is the data in the storage area 42 to be accessed has not been changed, the representative processor 2a performs a (normal) access to the storage area 42 under the hardware control. For example, if the data to be accessed in the storage area 42 matches the data in the cache 20 of the representative processor 2a, the representative processor 2a may access (e.g., refer to) the cache 20.

On the other hand, if there is an access conflict, in other words, if the data in the storage area 42 to be accessed has been changed, the representative processor 2a performs a consistency maintenance process on the storage areas 40 and 42 and then accesses the storage area 42 under the hardware control.

The consistency maintenance process is, for example, the process of reflecting updates that have been made by the plurality of processors 2a under the software control but have not yet been reflected to the storage area 42, to the storage area 42. The consistency maintenance process is not limited to this, and a variety of processes may be performed.

In the first method described above, all processors 2a may be inhibited from storing the management information 41 in their local cache 20 when accessing the storage area 40 in order to prevent any inconsistencies in the management information 41 among a plurality of processors 2a. For example, each processor 2a may perform a process to flush the local cache 20 when accessing the management information 41, or to access the management information 41 directly without using the cache 20.

The first method requires the software to check cache states that are sequentially updated and interrelated to one another as described above, and thus has higher processing costs, e.g., longer delay time (latency) due to the consistency control, compared to the consistency control by the hardware. As a result, the delay time may increase and the performances of accesses to the shared memory 4 from the plurality of processors 2a may be reduced.

For example, the more frequent accesses (reads and writes) to the shared memory 4 by the processors 2a controlled by the software are made, the more impact it has on the performances of the processors 2a subjected to the hardware control (performances are reduced). This is because data (control information) stored in the caches 20 of the processors 2a subjected to the software control is invalidated, which causes accesses to the shared memory 4 from the processors 2a subjected to the hardware control.

Yet, in the first method, if the frequency of accesses from the processors 2a subjected to the software control to the shared memory 4 is low, the latencies of accesses from the processors 2a to the shared memory 4 can be reduced to 200 nanoseconds (ns) or less, for example.

Note that the first method described above is merely one example of the first control. The first control is not limited to the first method described above, and various processes by the software may be employed.

(Example of Second Control)

The second control is a method in which the second processor(s) 2a subjected to the software control issue commands to cause a first processor 2a subjected to the hardware control to perform the consistency control. The second control includes, for example, the following second method, in which the second processors 2a subjected to the software control instructs a first processor 2a subjected to the hardware control to access the storage area 42 in the shared memory 4.

For example, in the second method, the plurality of processors 2a subjected to the software control may issue a command to a first processor 2a subjected to the hardware control to access the storage area 42 (storage area #1) in the shared memory 4, as indicated by the reference symbol B in FIG. 2.

The method for communicating the command in the second method may be provided by an IF similar to a remote procedure call (RPC), for example. The first processor 2a that receives the command may execute an access to the shared memory 4 as a local function if the command can be executed locally, or as a remote function otherwise. The RPC described above is used as the method for communicating commands in one embodiment, but this is not limiting. Various methods may be used to invoke a program on a processor 2*a* connected via the interconnect 1*a* and to execute the program.

In the second method, the first processor 2*a*, which has been requested through the RPC to access the storage area 42 (data manipulation), accesses the requested storage area 42 via the interconnect 1*b* according to the command, as indicated by the reference symbol D in FIG. 2. The execution of the command by the first processor 2*a* causes the hardware (control circuit 4*a*) to perform an access control (coherence control) as instructed by the executed command.

With the second method described above, even when the frequency of accesses (reads and writes) from the processors 2*a* subjected to the software control to the shared memory 4 is high, the decrease in performances of accesses from the processors 2*a* to the shared memory 4 is small. On the other hand, since accesses from the processors 2*a* subjected to the software control to the shared memory 4 are performed by RPC via processes communications on the interconnect 1*a*, the latencies are high, for example, about 1.5 microseconds (μs) or longer, for example.

As described above, the first method can suppress the decrease in performances of accesses from the processors 2*a* to the shared memory 4 during the execution of an application 11 when the frequency of accesses from the processors 2*a* subjected to the software control to the shared memory 4 is low.

On the other hand, in the second method, although the latencies due to RPC processes are high, the fluctuation in latency is small even when the frequency of accesses from the processors 2*a* subjected to the software control to the shared memory 4 is high and thus the decrease in performances of accesses can be suppressed.

The control program according to one embodiment causes the consistency control to be performed by the processors 2*a* subjected to the software control, either through the first control or the second control, based on the frequency of accesses from the plurality of processors 2*a* to the shared memory 4 using the method described below. As a result, it is possible to apply an appropriate control (first control or second control) to the access control of the processors 2*a* subjected to the software control based on the frequency of accesses, for example. This can improve the performances from the plurality of processors to the shared memory. Additionally, it is possible to maintain consistency regarding accesses to the shared memory 4 from the plurality of processors 2*a*. As a result, it is possible to provide an access method that balances both maintaining consistency and improving the performance of the system 1.

(B) Example of Hardware Configuration of Node

Figure 3:
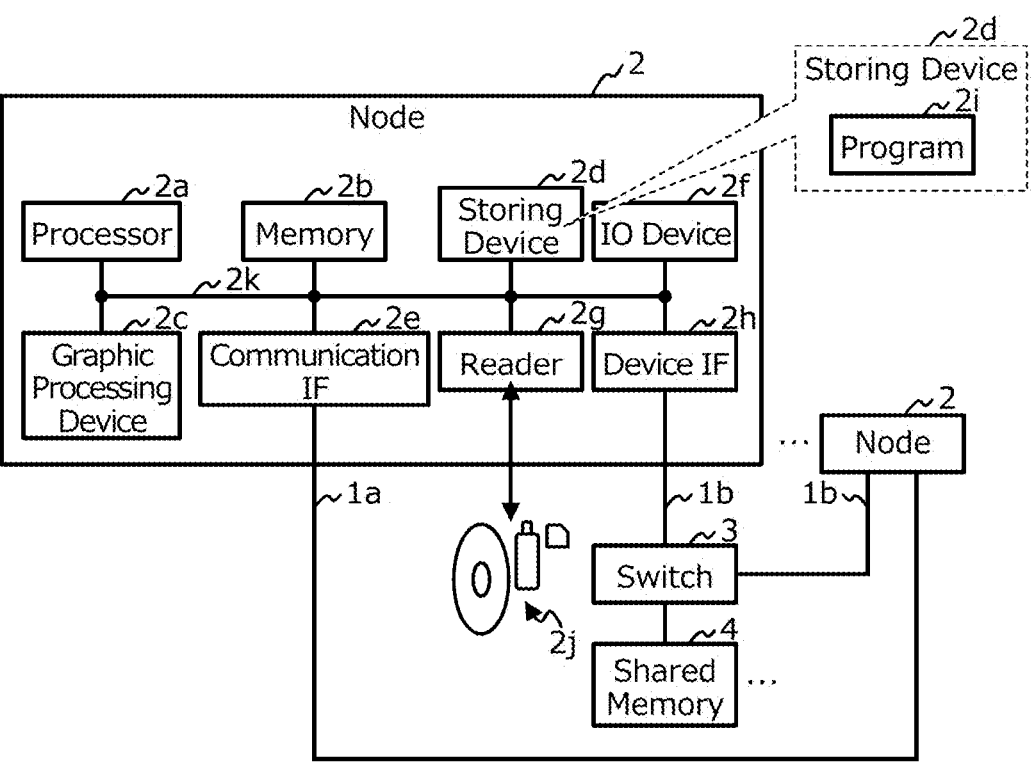
FIG. 3 is a block diagram illustrating an example of the hardware configuration of a node according to one embodiment.

FIG. 3 is a block diagram illustrating an example of the hardware configuration of a node 2 according to one embodiment. As illustrated in FIG. 3, the node 2 may include, by way of example, a graphic processing device 2*c*, a storing device 2*d*, a communication interface (IF) 2*e*, an IO device 2*f*, a reader 2*g*, and a device IF 2*h*, in addition to the processor 2*a* and the memory 2*b* illustrated in FIG. 1 as the HW configuration. These devices 2*a* to 2*h* may be communicatively connected to each other via various buses 2*k*.

Examples of the processor 2*a* include an integrated circuit (IC), such as a CPU, a Micro Processing Unit (MPU), an Accelerated Processing Unit (APU), a Digital Signal Processor (DSP), an Application Specific Integrated Circuit (ASIC), and a Field Programmable Gate Array (FPGA), for example.

Note that a combination of two or more of these integrated circuits may be used as the processor 2*a*. Alternatively, the processor 2*a* may be a multiprocessor including multiple processors or a multi-core processor including multiple processor cores, or may have a configuration having multiple multi-core processors. In one embodiment, as illustrated in FIGS. 1 and 2, two processors 2*a* are provided at each node 2. Furthermore, each processor 2*a* is provided with a cache 20.

Examples of the memory 2*b* include, for example, one or more of volatile memories such as DRAMs, and non-volatile memories such as PMs. The memory 2*b* may be, for example, a memory module having a DRAM chip mounted thereon or a nonvolatile memory module such as a PM.

The graphic processing device 2*c* is configured to control screen display on an output device such as a monitor of the IO device 2*f*. The graphic processing device 2*c* may also be configured as an accelerator that performs machine learning and inference processes using a machine learning model. Examples of the graphic processing device 2*c* include, for example, various arithmetic processing units, such as integrated circuits (ICs), e.g., a graphics processing unit (GPU), an APU, a DSP, an ASIC, and an FPGA.

The storing device 2*d* is one example of hardware configured to store information, such as a wide variety of data and programs. Examples of the storing device 2*d* include a wide variety of storing apparatuses, such as magnetic disk apparatuses, e.g., a Hard Disk Drive (HDD), solid state drive apparatuses, e.g., a Solid State Drive (SSD), and non-volatile memories, for example. Examples of the nonvolatile memories include, for example, a flash memory, a Storage Class Memory (SCM), and a Read Only Memory (ROM).

The storing device 2*d* may store a program 2*i* (control program, memory access control program) for embodying all or a part of the functions of the node 2.

For example, the processor 2*a* in the node 2 can embody the functions as the node 2 illustrated in FIG. 2 (e.g., controller 14 illustrated in FIG. 4), by loading the program 2*i* stored in the storing device 2*d* into the memory 2*b* and executing the program 2*i* loaded on the memory 2*b*.

The communication IF 2*e* controls connections and communications between nodes, and between the node 2 and a host apparatus (not illustrated) that gives various instructions, etc. to the nodes 2. For example, the communication IF 2*e* may include an adapter compliant with the communication standard of the interconnect 1*a* illustrated in FIG. 1. The communication IF 2*e* may be connected to other nodes 2 via the interconnect 1*a*.

Note that the program 2*i* may be downloaded to the node 2 from a network not illustrated via the communication IF 2*e* and stored in the storing device 2*d*.

The IO device 2*f* may include one or both of an input device and an output device. Examples of the input device include a keyboard, a mouse, a touch-screen, and other devices, for example. Examples of the output device include display devices, such as a monitor, a projector, and a printer, for example. The IO device 2*f* may also include a touch-screen or other device that integrates an input device and an output device. The output device may be connected to the graphic processing device 2*c*.

The reader 2*g* is one example of a reader that reads information of data and a program recorded on a recording medium 2*j*. The reader 2*g* may include a connection terminal or device to which the recording medium 2*j* can be connected or inserted. Examples of the reader 2*g* include an adapter compliant with the Universal Serial Bus (USB) or any of other standards, a drive device for accessing a recording disk, and a card reader for accessing a flash memory, such as an SD card, for example. Note that recording medium 2*j* may store the program 2*i*, and the reader 2*g* may read the program 2*i* from the recording medium 2*j* and store it in the storing device 2*d*.

Examples of the recording medium 2*j* may include non-transitory computer-readable recording media, such as magnetic and/or optical disks and flash memories, for example. Examples of magnetic and/or optical disks may include, as an example, flexible disks, Compact Discs (CDs), Digital Versatile Discs (DVDs), Blu-ray discs, and Holographic Versatile Discs (HVDs). Examples of flash memories may include semiconductor memories, such as a USB memory and an SD card, for example.

The device IF 2*h* controls connections and communications between the node 2 and the switch 3, between nodes 2, and the like. For example, the device IF 2*h* may include an adapter compliant with the communication standard for the interconnect 1*b* illustrated in FIG. 1. The device IF 2*h* may be connected to the switch 3 (and one or more shared memories 4) via the interconnect 1*b*.

The hardware configuration of the node 2 described above is merely exemplary. Accordingly, in the node 2, hardware may be added or omitted (e.g., any blocks may be added or omitted), divided, or combined in any combinations, or a bus may be added or omitted, where it is deemed appropriate. For example, the IO device 2*f* and the reader 2*g* or any other device may be omitted from the node 2.

(C) Example of Software Configuration

Figure 4:
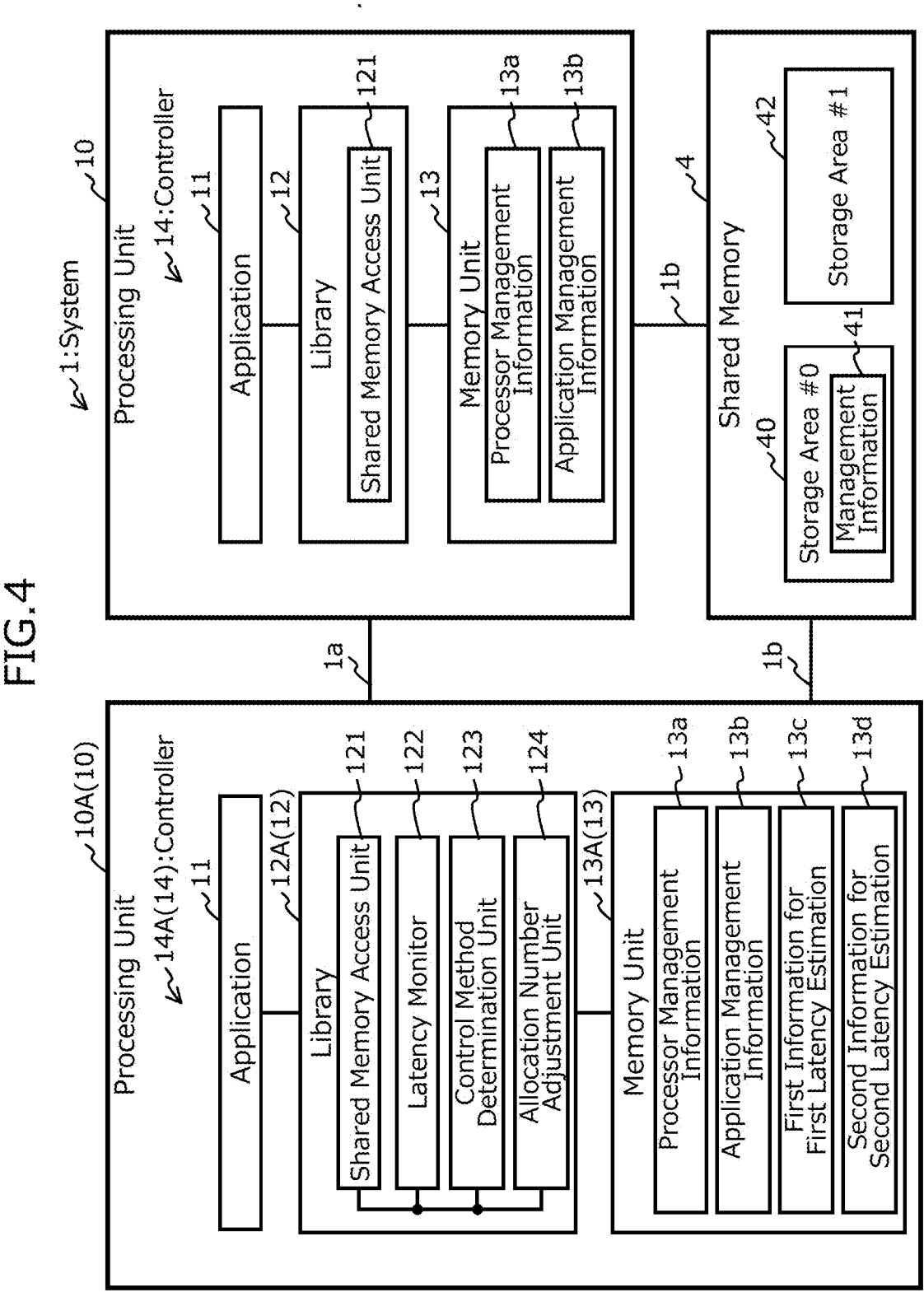
FIG. 4 is a block diagram illustrating an example of the software configuration of a node according to one embodiment.

FIG. 4 is a block diagram illustrating an example of the software configuration of a node 2 according to one embodiment. As illustrated in FIG. 4, the node 2 may include a processing unit 10 as the software configuration. The processing unit 10 may be implemented by a processor 2*a* (e.g., processors 2*a* illustrated in FIG. 1).

In the following explanation, in the symbols of the software components including the processing unit 10, the letter A is added to the software components specific to the node 2 executing the control program. For example, the processing unit 10 in the node 2 executing the control program is denoted as the processing unit 10A. In the following explanation, software components without the letter A added thereto are the software components that are common to both the node 2 executing the control program and the nodes 2 not executing the control program.

(C-1) Example of Common Software Configuration of Processing Unit

First, an example of the common software configuration of the processing unit 10 is described below. As illustrated in FIG. 4, the processing unit 10 may include an application(s) 11, a library 12, and a memory unit 13. The application(s) 11 and the library 12 are examples of a controller 14.

The application(s) 11 is software that is executed on the operating system (OS) of the node 2 and is one example of a program. An application 11 may be executed by one or more processors 2*a*. In one embodiment, it is assumed for simplicity that an application 11 is executed by a plurality of processors 2*a*, and that each processor 2*a* executes one application 11.

The memory unit 13 is one example of a storage area and stores various data used by the node 2. The memory unit 13 may be embodied, for example, by storage areas possessed by at least one of the caches 20 illustrated in FIG. 1, the memory 2*b* and memories 4*b* illustrated in FIGS. 1 and 3, and the storing device 2*d* illustrated in FIG. 3. The memory unit 13 may be embodied by storage areas possessed by the memories 2*b* provided in the other nodes 2.

As illustrated in FIG. 4, the memory unit 13 may, by way of example, be capable of storing processor management information 13*a* and application management information 13*b*. In the following explanation, these pieces of information 13*a* and 13*b* will be presented in table format, but this is not limiting and information 13*a* and 13*b* may be data in various formats such as database (DB) format and array format.

FIG. 5 is a diagram illustrating one example of the processor management information 13*a*. The processor management information 13*a* is information for managing each of the plurality of processors 2*a* provided in the system 1. As illustrated in FIG. 5, the processor management information 13*a* may include the items of the processor number, node number, application identifier (ID), control flag, address and size of memory area used for RPC, and host Internet Protocol (IP) address.

The processor number is one example of identification information for the processors 2*a* provided in the system 1. The node number is one example of identification information for the nodes 2 provided in the system 1.

The application ID is one example of identification information for applications 11 executed by processor 2*a*. The processor 2*a* executing an application 11 may be determined or identified when the application 11 is executed on the system 1. For example, once the processor 2*a* executing the application 11 is identified, the library 12 or 12A (see FIG. 4) may set the identification information of the application 11 to the application ID of the processor 2*a*.

The control flag is a flag indicating whether the consistency control of the processor 2*a* is controlled by the software or hardware. For example, a control flag of "0" indicates software control, and "1" indicates hardware control.

The address and size of memory area used for RPC are the address and size of the memory respectively, to which an RPC command is written when an RPC is issued to the processor 2*a*. The host IP address is one example of the address of the processor 2*a*.

For example, if the processor #1 in the node #1 issues an RPC command to the processor #0 in node #0, the processor #1 may write a command of 1024 bytes or less to the address "0x1000" of the memory 2*b* at the host IP address "192.168.0.1".

FIG. 6 is a diagram illustrating one example of the application management information 13*b*. The application management information 13*b* is information for managing each of a plurality of applications 11 executed by processors 2*a*. As illustrated in FIG. 6, the application management information 13*b* may include items of the application ID and address and size of shared memory.

The application ID is one example of identification information of the application 11. The address and size of shared memory are the address and size of the storage area 42, respectively, in the shared memory 4 allocated to the application 11.

The processor management information 13*a* and the application management information 13*b* may be created and updated by the library 12A in the processing unit 10A to be described below.

The library 12 is user-level software present in the hierarchy between the OS and the application 11. The library 12 may include a shared memory access unit 121.

The shared memory access unit 121 accesses the shared memory 4 in conjunction with the execution of an application 11. Note that the address and size of the shared memory 4 (the storage area 42) to be accessed from each application 11 can be obtained from the application management information 13*b*.

When an access from an application 11 to the shared memory 4 arises, for example, the shared memory access unit 121 refers to the processor management information 13*a* to determine whether the local processor 2*a* is under the hardware or software control.

(When Local Processor 2*a* is under Hardware Control)

When the local processor 2*a* is under the hardware control, the shared memory access unit 121 accesses the shared memory 4 via the interconnect 1*b*. The consistency control of this access is performed by the control circuit 4*a* in the shared memory 4. At this time, if a processor 2*a* subjected to the software control is under the first control, the shared memory access unit 121 may perform the following process. On the other hand, if the processor 2*a* subjected to the software control is under the second control, the shared memory access unit 121 may perform the following process.

Whether the processor 2*a* subjected to the software control is under the control of either the first control or the second control may be notified to each processor 2*a* by the processing unit 10A when the method for the software control is determined or changed, for example.

When Processor 2*a* Subjected to Software Control is under First Control

When a processor 2*a* subjected to the software control is under the first control, the shared memory access unit 121 determines whether or not the local processor 2*a* is the representative processor 2*a* that performs controls according to the management information 41. The representative processor 2*a* may be, for example, designated by the processing unit 10A, or may be the processor 2*a* with the smallest node number and the smallest processor number in entries with a control flag of "1" in the processor management information 13*a* (in the example in FIG. 5, the processor #0 in the node #0).

If the local processor 2*a* is the representative processor 2*a*, the shared memory access unit 121 performs the process as the representative processor 2*a* in the first control described above. For example, if the data in the storage area 42 to be accessed has been changed, the shared memory access unit 121 performs the consistency maintenance process on the storage areas 40 and 42, and then accesses the storage area 42.

On the other hand, if the local processor 2*a* is not the representative processor 2*a*, the shared memory access unit 121 accesses the shared memory 4 via the interconnect 1*b* as in the case of the normal control by the hardware.

When Processor 2*a* Subjected to Software Control is under Second Control

When a processor 2*a* subjected to the software control is under the second control, the shared memory access unit 121 accesses the shared memory 4 via the interconnect 1*b* as in the case of the normal control by the hardware.

Note that a processor 2*a* under the hardware control may receive an RPC command from the processor 2*a* under the second control. In this case, the shared memory access unit 121 executes an access to the shared memory 4 requested by the processor 2*a* under the second control according to the command written at the address of the memory area used for RPC in the processor management information 13*a*.

(When Local Processor 2*a* is Under Software Control)

When the local processor 2*a* is under the software control, the shared memory access unit 121 may perform the following process depending on whether the software control is under the first control or the second control.

When Software Control is under First Control

When the software control is under the first control, the shared memory access unit 121 performs the process as a processor 2*a* subjected to the software control in the first control described above. For example, the shared memory access unit 121 records (sets) information about the cache of the data stored in the storage area 42, into the management information 41 in the storage area 40.

When Software Control is under Second Control

When the software control is under the second control, the shared memory access unit 121 performs the process as a processor 2*a* subjected to the software control in the second control described above. For example, the shared memory access unit 121 generates an RPC command instructing an access to the storage area 42 in the shared memory 4, and stores (sends) it to the memory area used for RPC of a processor 2*a* under the hardware control. Note that the processor 2*a* under the hardware control to which the RPC command is sent may be, for example, one of the processors 2*a* of which control flag in the processor management information 13*a* is "1", or the representative processor 2*a*.

(C-2) Example of Software Configuration of Processing Unit Executing Control Program Next, an example of the software configuration of the processing unit 10A is described. As illustrated in FIG. 4, the processing unit 10A may include an application(s) 11, a library 12A, and a memory unit 13A. The application 11 and the library 12A are examples of the controller 14A (14).

The memory unit 13A may, by way of example, be capable of storing first information 13*c* for first latency estimation and second information 13*d* for second latency estimation, in addition to the information 13*a* and 13*b* stored by the memory unit 13. In the following description, these pieces of information 13*c* and 13*d* will be represented in table format, but this is not limiting and information 13*c* and 13*d* may be data in various formats such as DB format and array format.

In addition to the shared memory access unit 121 provided in the library 12, the library 12A may include, by way of example, a latency monitor 122, a control method determination unit 123, and an allocation number adjustment unit 124.

The latency monitor 122 monitors (executes first monitoring of) the latencies of accesses to the shared memory 4 by each processor 2*a* during the first control and updates the first information 13*c* for first latency estimation. In addition, the latency monitor 122 monitors (executes second monitoring of) the latencies of accesses to the shared memory 4 by each processor 2*a* during the second control and updates the second information 13*d* for second latency estimation. Note that various methods may be used to monitor access latencies.

The latency monitor 122 monitors, for example, the average latency of accesses to the storage area 42 in the shared memory 4 over a given period of time (e.g., for one minute) from all of the processors 2*a* subjected to the hardware control and the processors 2*a* subjected to the software control (first control). The latency monitor 122 sets the monitoring result to the first information 13*c* for first latency estimation.

FIG. 7 is a diagram illustrating one example of the first information 13*c* for first latency estimation. As illustrated in FIG. 7, the first information 13*c* for first latency estimation may include items of the number of processors under the hardware control, number of processors under the first control (under the software control), number of requests per second (sec.) under the hardware control, number of requests per second (sec.) under the first control (under the software control), and average latency (ns).

The numbers of processors under the hardware control and the number of processors under the first control are the number of processors 2a subjected to the hardware control and the number of processors 2a subjected to the first control, respectively, when the first monitoring is performed, and can be obtained from the processor management information 13a, for example.

The number of requests per sec. under the hardware control is the (average) number of requests per second issued by all the processors 2a subjected to the hardware control to the storage area 42 in the shared memory 4. The number of requests per sec. under the first control is the (average) number of requests per second issued by the processors 2a subjected to the first control to the storage area 42 in the shared memory 4.

The average latency is the average value of the delay time (latencies) from the issuance of an access request to the shared memory 4 to the receipt of a response of the access completion, for example, for both the processors 2a subjected to the hardware control and the processors 2a subjected to the first control, over a given period of time.

For example, the latency monitor 122 sets the calculated average latency, along with the obtained (calculated) results of the numbers of processors under the hardware control and under the first control and the numbers of requests per sec. under the hardware control and under the first control at that time, in the first information 13c for first latency estimation.

Furthermore, during the second monitoring, the latency monitor 122 monitors the average latency of accesses to the storage area 42 in the shared memory 4 from all of the processors 2a subjected to the hardware control and the processors 2a subjected to the software control (second control) for a given period of time (e.g., for one minute). The latency monitor 122 sets the monitoring results to the second information 13d for second latency estimation.

FIG. 8 is a diagram illustrating one example of the second information 13d for second latency estimation. As exemplified in FIG. 8, the second information 13d for second latency estimation may include the items of the number of processors under the hardware control, number of processors under the second control (under the software control, using RPCs), number of requests per second (sec.) under the hardware control, number of requests per second (sec.) under the second control (under the software control, using RPCs), and average latency (ns).

The number of processors under the hardware control and the number of processors under the second control are the number of processors 2a subjected to the hardware control and the number of processors 2a subjected to the second control, respectively, when the second monitoring is performed, and can be obtained from the processor management information 13a, for example.

The number of requests per sec. under the hardware control is the (average) number of requests per second issued by all the processors 2a subjected to the hardware control to the storage area 42 in the shared memory 4. The number of requests per sec. under the second control is the (average) number of requests per second issued by the processors 2a subjected to the second control to the storage area 42 in the shared memory 4, e.g., the (average) number of RPC commands issued.

The average latency is the average value of the delay time (latencies) from the issuance of an access request (or an RPC command) to the shared memory 4 to the receipt of a response of the access completion, for example, for both the processors 2a subjected to the hardware control and the processors 2a subjected to the second control, over a given period of time.

For example, the latency monitor 122 sets the calculated average latency, along with the obtained (calculated) results of the numbers of processors under the hardware control and under the second control and the numbers of requests per sec. under the hardware control and under the second control at that time, in the second information 13d for second latency estimation.

Note that the latency monitor 122 may perform initial monitoring in the initial state, such as at startup of the system 1. In the initial monitoring, the latency monitor 122 may calculate the respective average latencies of the first and second controls under various conditions while varying the conditions, and set the results in the first information 13c for first latency estimation and the second information 13d for second latency estimation. The conditions are combinations of the values of the number of processors under the hardware control, number of processors under the software control, number of requests per sec. under the hardware control, and number of requests per sec. under the software control.

The control method determination unit 123 determines the control method (first control or second control) for the consistency control on processors 2a subjected to the software control based on the first information 13c for first latency estimation and the second information 13d for second latency estimation.

For example, at a given timing, the control method determination unit 123 compares the monitored result of the average latency with the currently enabled control method against the estimated average latency with the currently disabled control method assuming the same conditions.

A currently enabled control method is a control method that is currently applied to the processors 2a subjected to the software control and is either the first control or the second control, and a currently disabled control method is a control method that is not currently applied to the processors 2a subjected to the software control and is either the first control or the second control. The given timing is, for example, the timing when the number of accesses to the shared memory 4 exceeds a first threshold value (e.g., 100000) or when a certain period of time (e.g., one minute) has elapsed.

As an example, a case is assumed where second control is currently enabled, the number of processors under the hardware control is 8, the number of processors under the second control is 24, the number of requests per sec. under the hardware control is 10000, and the number of requests per sec. under the second control is 40.

In this case, the control method determination unit 123 obtains the most recent second monitoring result (e.g., the average latency is 1500 ns) obtained from the latency monitor 122.

Furthermore, the control method determination unit 123 searches for an entry in the first information 13c for first latency estimation under the same conditions, specifically, an entry with a number of processors under the hardware control of 8, a number of processors under first control of 24, a number of requests per sec. under a hardware control of 10000, and a number of requests per sec. under first control of 40.

If there is an entry in the first information 13c for first latency estimation with conditions that match the conditions of the second monitoring, the control method determination unit 123 obtains the average latency of the matched entry, i.e., 600 ns (see the fourth entry in FIG. 7), as the estimated value.

On the other hand, if there is no matching entry, the control method determination unit 123 may calculate an estimated value of the average latency with substantially the same conditions, from multiple entries included in the first information 13c for first latency estimation, using any of various methods, such as nearest neighbor retrieval or linear interpolation processing.

Since the average latency (1500 ns) of the second control that is currently enabled is greater than the average latency (600 ns) of the first control that is currently disabled, the control method determination unit 123 selects the first control as the control method, e.g., disables the second control and enables the first control.

If the average latency (estimated value) of the currently disabled control method is greater than or equal to the average latency (monitored result) of the currently enabled control method, the control method decision unit 123 may decide to continue to use the currently enabled control method.

A similar process is performed if the currently enabled control method is the first control. For example, the control method determination unit 123 selects the second control as the control method if the average latency (monitoring result) of the first control that is currently enabled is greater than the average latency (estimated value) of the second control that is currently disabled.

In this manner, the control method determination unit 123 selects the first control or the second control based on the result of a comparison between an access latency when the first control is executed and an access latency when the second control is executed. This allows the selection of a consistency control method that can reduce latencies, thereby improving the performances of accesses to the shared memory 4 from the plurality of processors 2a.

The allocation number adjustment unit 124 adjusts the number of processors 2a subjected to the hardware control to be allocated to each application 11 when each of a plurality of applications 11 is executed by one or more processors 2a. Hereinafter, the number of processors 2a subjected to the hardware control may be denoted as "allocation number for hardware control" or simply as "allocation number".

The allocation adjustment unit 124 may adjust the allocation numbers so that the average latencies, combining the processors 2a subjected to the hardware control and the processors 2a subjected to the software control together, are equalized among a plurality of applications 11, for each a plurality of applications 11, for example.

As described above, the number of processors for which the consistency control by the control circuit 4a (hardware) can be performed is limited to the given number k. The performances of accesses from the processors 2a to the shared memory 4 are higher (the latency is smaller) under the hardware control than under the software control.

Therefore, as an example, in response to the change in the count of applications 11 executed in the system 1, the allocation adjustment unit 124 may assign the same allocation numbers for hardware evenly to each application 11, with the given number k as the upper limit. The change of the count of applications 11 may be, for example, detection of the addition or termination of an application 11 by the allocation adjustment unit 124.

Furthermore, the processors 2a executing each application 11 and the number of the processors may vary from application 11 to application 11. Hence, the allocation adjustment unit 124 may refer to the processor management information 13a and perform the assignment based on the ratio among the numbers of processors executing respective applications 11. For example, the allocation may assign a higher allocation number for hardware control to an application executed by a larger number of processors.

Once determining the allocation number for hardware control, the allocation adjustment unit 124 determines the number of processors 2a subjected to the software control (hereinafter sometimes referred to as the "allocation number for software control") by subtracting the allocation number for hardware control from the number of processors 2a executing the application 11.

According to the above-described allocation method, for example, an application 11 introduced for the first time when the system 1 is not executing any applications will be assigned the maximum assignable allocation number for hardware control. The maximum assignable allocation number for hardware control is the given number k if the number of processors executing that application 11 is greater than or equal to the given number k, or the number of processors executing that application 11 if the number of processors executing the application 11 is smaller than the given number k. Then, when another application 11 is introduced into the system 1, the allocation number for hardware control assigned to the first application 11 is reduced, and the reduced allocation number for hardware control is assigned to the newly-introduced application 11.

Furthermore, the allocation adjustment unit 124 may assign processors 2a in the allocation number for hardware control to be subjected to the hardware control, for each application 11 to which the allocation number for hardware control is assigned.

For example, the allocation adjustment unit 124 may monitor the frequency of access conflicts to the shared memory 4 caused by each processor 2a, and may preferentially assign processors 2a causing access conflicts more frequently to be subjected to the hardware control. Various methods may be used as the method for monitoring the frequency of occurrence of access conflicts.

Alternatively, the allocation adjustment unit 124 may preferentially assign processors 2a with smaller node numbers and processor numbers in the processor management information 13a to be subjected to the hardware control, or may use various other methods to assign processors 2a to be subjected to the hardware control.

Once determining the allocation number for hardware control, the allocation number for software control, processors 2a to be subjected to the hardware control, and processors 2a to be subjected to the software control for each application 11, the allocation adjustment unit 124 may update the control flags in the processor management information 13a. This enables the processors 2a for executing a given application 11, information as to whether the processors 2a are to be under the hardware control or under the software control, the allocation number for hardware control, and the allocation number for software control, to be obtained from the processor management information 13a.

In the meantime, the frequency of accesses from a processor 2a to the shared memory 4 varies depending on the application 11 executed by the processor 2a. Therefore, if the same allocation numbers for hardware control is assigned evenly to every application 11 by the above-described allocation method, there is a possibility of disparity of access performances among the applications 11.

For example, a large allocation number for hardware control would be assigned preferentially to an application 11 with a high access frequency. In this case, however, this application 11 would occupy the consistency control by the hardware, making it difficult to maintain fairness with other applications 11.

To prevent such a situation, the allocation adjustment unit 124 measures the average latency of accesses to the shared memory 4 from each application 11 at given intervals (e.g., every one minute). For example, the allocation adjustment unit 124 may instructs the latency monitor 122 to measure the average latency of one or more processors 2a (processor group) executing an application 11 as measurement targets.

Thereby, the allocation adjustment unit 124 obtains, for each application 11, the numbers of processors under the hardware and software control among the processor group, the numbers of requests per sec. under the hardware and software control, and the average latency, at given intervals.

Then, if there is a disparity exceeding a second threshold in the measured average latencies among the applications 11, the allocation adjustment unit 124 determines that there is an imbalance of the allocation number for hardware control among the applications 11 and adjusts the allocation number for hardware control of each application 11.

For example, the allocation adjustment unit 124 may calculate statistical information of a plurality of average latencies measured for all applications 11 executed on the system 1. An example of statistical information is the variance. The allocation number adjustment unit 124 may determine that there is an imbalance of the allocation numbers for hardware control among the applications 11 if the variance is greater than the second threshold.

If the variance is greater than the second threshold, the allocation adjustment unit 124 refers, for example, to the first information 13c for first latency estimation or the second information 13d for second latency corresponding estimation to the currently enabled control method (first control or second control). The following explanation assumes that the currently enabled control method is the first control.

For example, the allocation adjustment unit 124 obtains, from the first information 13c for first latency estimation, the average latency (first average latency) of the entry with the same conditions as the conditions during the measurement of the average latency of the application 11. Additionally, the allocation adjustment unit 124 obtains, from the first information 13c for first latency estimation, the average latency (second average latency) from the entries with the conditions where the numbers of processors under the hardware and software control were varied among conditions during the measurement of the average latency of the application 11.

The allocation number adjustment unit 124 compares the first average latency with the second average latency for each application 11 and identifies the allocation number for hardware control for each application 11 so that a given condition is met among the applications 11. Meeting the given condition may be, for example, equalizing the average latencies. Equalizing the average latencies may mean, for example, that the average latencies of a plurality of applications 11 become the same or substantially the same, in other words, that difference in average latency approaches 0 (zero).

For example, the allocation adjustment unit 124 may assign a greater allocation number for hardware control than that was assigned during the measurement of the average latency, to an application 11 with a smaller average latency compared to other applications 11. This may mean that the conditions (number of processors under the hardware control, number of processors under the software control) of the second average latency where the first average latency>the second average latency, are assigned to the application 11.

On the other hand, the allocation adjustment unit 124 may assign a smaller allocation number for hardware control than that was assigned during the measurement of the average latency, to an application 11 with a greater average latency compared to other applications 11. This may mean that the conditions (number of processors under the hardware control, number of processors under the software control) of the second average latency where the first average latency<the second average latency, are assigned to the application 11.

The allocation number adjustment unit 124 performs adjustment (search) of the allocation number for hardware control by comparing the first average latency and the second average latency for each application 11. For example, the allocation number adjustment unit 124 may repeat the search until the difference in average latency among the applications 11 is smaller than and equal to a third threshold. This allows for averaging (equalization) of the access performances to the shared memory 4 by the applications 11.

In the above-described adjustment, the allocation number adjustment unit 124 may also determine processors 2a subjected to the hardware control using the above-described methods, such as preferentially assigning processors 2a causing access conflicts more frequently to be subjected to the hardware control.

Note that the method of adjusting the allocation numbers for hardware control by the allocation adjustment unit 124 is not limited to the method described above, and various other methods may be used.

(D) Examples of Operations

Next, examples of the operations of the system 1 according to one embodiment will be described. Referring to FIGS. 9 to 13, an example of the operation of the processing unit 10A embodied by a processor 2a that executes the control program is described.

(D-1) Example of Operation of Latency Monitor

FIGS. 9 and 10 are flowcharts illustrating examples of the operations of the first latency monitoring and the second latency monitoring, respectively. The processes in FIGS. 9 and 10 may be performed at given intervals.

As illustrated in FIG. 9, the latency monitor 122 measures the average latency of accesses from processors 2a subjected to the first control (software control) during the most recent given period of time, under the first control (Step S1).

The latency monitor 122 measures the average latency of access by processors 2a subjected to the hardware control during the most recent given period of time, under the first control (Step S2).

The latency monitor 122 records the conditions upon the measurements in Steps S1 and S2 and the average values of the average latencies measured in Steps S1 and S2 in first information 13c for first latency estimation (Step S3), and the process ends. The conditions upon the measurements include, for example, the numbers of processors subjected to the hardware and software control, and the numbers of requests per sec. under the hardware and software control.

As illustrated in FIG. 10, the latency monitor 122 measures the average latency of accesses from processors 2a subjected to the second control (software control) during the most recent given period of time, under the second control (Step S11).

The latency monitor 122 measures the average latency of access by processors 2*a* subjected to the hardware control during the most recent given period of time, under the second control (Step S12).

The latency monitor 122 records the conditions upon the measurements in Steps S11 and S12 and the average values of the average latencies measured in Steps S11 and S12 in the second information 13*d* for second latency estimation (Step S13), and the process ends.

(D-2) Example of Operation of Control Method Determination Unit

Figure 11:
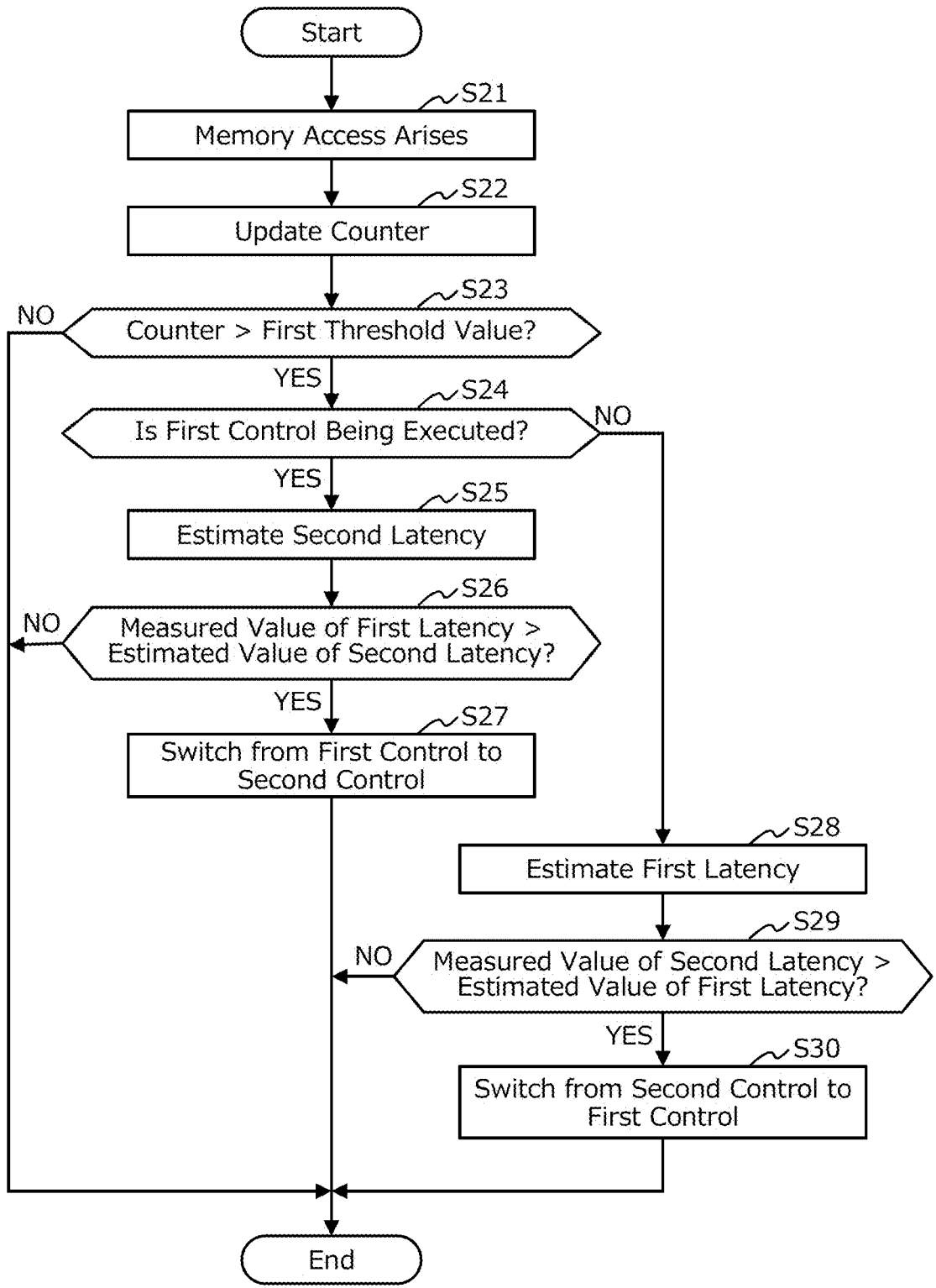
FIG. 11 is a flowchart illustrating an example of the operation of a control method determination process.

FIG. 11 is a flowchart illustrating an example of the operation of the control method determination process. As illustrated in FIG. 11, when an access to the shared memory 4 arises (Step S21), the control method determination unit 123 updates a counter (Step S22) and determines whether the counter exceeds a first threshold value (e.g., 100000) (Step S23).

If the counter does not exceed the first threshold (NO in Step S23), the process ends. If the counter exceeds the first threshold (YES in Step S23), the control method determination unit 123 determines whether the first control is being executed (enabled) as the software control (Step S24).

If the first control is being executed (YES in Step S24), the control method determination unit 123 obtains the most recent measured value of the first latency (monitoring result) by the latency monitor 122 and estimates the second latency (Step S25). For example, the control method determination unit 123 may obtain, as the second latency, the average latency under the same conditions as the conditions upon the measurement of the first latency, from the second information 13*d* for second latency estimation.

The control method determination unit 123 determines whether the measured value of the first latency is greater than the estimated value of the second latency (Step S26). If the measured value of the first latency is less than or equal to the estimated value of the second latency (NO in Step S26), the process ends.

If the measured value of the first latency is greater than the estimated value of the second latency (YES in Step S26), the control method determination unit 123 switches the control method from the first control to the second control (Step S27) and the process ends.

If the second control is being executed in Step S24 (NO in Step S24), the control method determination unit 123 obtains the most recent measured value of the second latency (monitoring result) by the latency monitor 122 and estimates the first latency (Step S28). For example, the control method determination unit 123 may obtain, as the first latency, the average latency under the same conditions as the conditions upon the measurement of the second latency, from the first information 13*c* for first latency estimation.

The control method determination unit 123 determines whether the measured value of the second latency is greater than the estimated value of the first latency (Step S29). If the measured second latency is less than or equal to the estimated first latency (NO in Step S29), the process ends.

If the measured value of the second latency is greater than the estimated value of the first latency (YES in Step S29), the control method determination unit 123 switches the control method from the second control to the first control (Step S30) and the process ends.

(D-3) Example of Operation of Allocation Adjustment Unit

Figure 12:
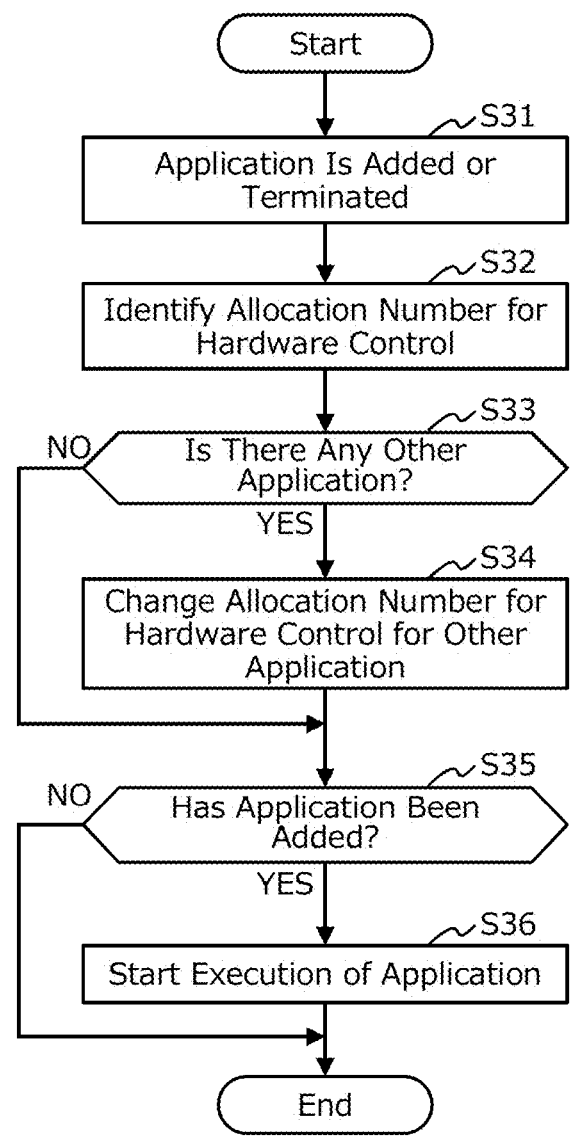
FIG. 12 is a flowchart illustrating an example of the operation of a process when the application count is changed.

FIG. 12 is a flowchart illustrating an example of the operation of the process when the application count is changed. FIG. 13 is a flowchart illustrating an example of the operation of the allocation number adjustment process. Note that the process in FIG. 13 may be performed at regular intervals.

As illustrated in FIG. 12, in response to detecting the addition or termination of an application 11 (Step S31), the allocation number adjustment unit 124 identifies the allocation number for hardware control of the added or terminated application 11 (Step S32). For example, when an application 11 is added, the allocation adjustment unit 124 calculates the allocation number for hardware control to be assigned to the application 11, or when an application 11 is terminated, the allocation adjustment unit 124 identifies the allocation number for hardware control that has been assigned to the application 11.

The allocation number adjustment unit 124 determines whether any other application 11 is being executed (Step S33). If any other application 11 is being executed (YES in Step S33), the allocation number adjustment unit 124 changes the allocation number for hardware control of the other application 11 (Step S34).

Note that the allocation number adjustment unit 124 may calculate the allocation number for hardware control so that allocation numbers for hardware control are equalized among the applications 11 in Step S32 (when an application 11 is added) and Step S34. For the calculation, information such as the count of applications 11 that are being executed, the numbers of processors executing the respective applications 11, and the given number k may be used.

After completion of Step S34, or if no other application 11 is being executed in Step S33 (NO in Step S33), the process transitions to Step S35. In Step S35, the allocation number adjustment unit 124 determines whether the application 11 has been added in Step S31. If no application 11 has been added in Step S31 (NO in Step S35), the process ends.

If the application 11 has been added in Step S31 (YES in Step S35), the allocation number adjustment unit 124 starts executing the added application 11 (Step S36) and the process ends.

As illustrated in FIG. 13, the allocation number adjustment unit 124 obtains the latency monitoring result (measured value) for each application 11 during the most recent given period of time, from the latency monitor 122 (Step S41).

The allocation number adjustment unit 124 calculates statistical information (e.g., variance) of the measured values of latencies (first latencies) of the plurality of applications 11 (Step S42).

The allocation number adjustment unit 124 determines whether the statistical information exceeds a second threshold (Step S43). If the statistical information does not exceed the second threshold (NO in Step S43), the process ends.

If the statistical information exceeds the second threshold (YES in Step S43), the allocation number adjustment unit 124 searches for allocation numbers for hardware control for the respective application 11 so that the latencies of the plurality of applications 11 are equalized (Step S44).

The allocation number adjustment unit 124 reflects the allocation numbers for hardware control to the respective application 11 (Step S45), and the process ends.

(E) Miscellaneous

The technique according to the aforementioned embodiment may be practiced in the following modifications or variations.

For example, the shared memory access unit 121, the latency monitor 122, the control method determination unit 123, and the allocation number adjustment unit 124 provided in the library 12A illustrated in FIG. 4 may be combined in any combination, or each may be divided. In addition, the processor management information 13*a*, the application management information 13*b*, the first information 13*c* for first latency estimation, and the second information 13*d* for second latency estimation stored in the memory unit 13A may be merged in any combination, or each may be divided.

Furthermore, although the application 11 and the processor 2*a* have been described as the smallest units for controls in one embodiment, this is not limiting. For example, the library 12A may switch between the hardware control and software control (first control and second control) on a process basis instead of on an application 11 basis. Furthermore, the library 12A may switch between the hardware control and software control (first control and second control) on a processor core basis or on a node 2 basis instead of on a processor 2*a* basis. In such cases, the processor management information 13*a* and the application management information 13*b* may be managed on a processor core basis or on a process basis.

In one aspect, the performances of accesses to a shared memory from a plurality of processors can be improved.

Throughout the descriptions, the indefinite article "a" or "an", or adjective "one" does not exclude a plurality.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a memory access control program causing one of a plurality of processors to execute a process comprising:

upon controlling a consistency of data in response to an access from each of the plurality of processors to a shared memory comprising a storage area shared among the plurality of processors, the plurality of processors including one or more first processors for which the consistency is controlled by hardware and one or more second processors for which the consistency is controlled by software, determining the number of the one or more first processors; and performing, based on a frequency of the access to the shared memory from the plurality of processors, a consistency control in response to the access to the shared memory from the one or more second processors, the number of the one or more second processors being excluded the determined number of the one or more first processors from the plurality of processors, by performing a first consistency control or a second consistency control, the first consistency control being performed by software executed by the one or more second processors, and the second consistency control being performed by one of the one or more first processors according to a command issued by the one or more second processors.

2. The non-transitory computer-readable recording medium according to claim 1, wherein the performing of the consistency control in response to the access from the one or more second processors comprises selecting the first consistency control or the second consistency control based on a result of a comparison between an access latency from the plurality of processors to the shared memory in response to the first consistency control being performed and an access latency from the plurality of processors to the shared memory in response to the second consistency control being performed.

3. The non-transitory computer-readable recording medium according to claim 1, wherein the first consistency control comprises:

setting, by the one or more second processors, information about a cache status in management information stored in a given storage area of the shared memory; and performing, by the one of the one or more first processors, the consistency control by referring to the management information in response to accessing the shared memory.

4. The non-transitory computer-readable recording medium according to claim 1, wherein the second consistency control comprises:

issuing, by the one or more second processors, a command to the one of the one or more first processors to instruct an access to the shared memory; and executing the command by the one of the one or more first processors to cause the hardware to control the consistency of data in response to the access instructed in the executed command.

5. The non-transitory computer-readable recording medium according to claim 1, wherein each of the plurality of processors executes a program allocated to one or more processors of the plurality of processors, and the determining of the number of the one or more first processors comprises determining the number of processors to operate as the one or more first processors from one or more processors executing a process for each of a plurality of the programs such that access latencies to the shared memory from each of the plurality of programs executed by the plurality of processors meet a given condition among the plurality of programs.

6. A computer-implemented memory access control method comprising a process executed by one of a plurality of processors, the process comprising:

upon controlling a consistency of data in response to an access from each of the plurality of processors to a shared memory comprising a storage area shared among the plurality of processors, the plurality of processors including one or more first processors for which the consistency is controlled by hardware and one or more second processors for which the consistency is controlled by software, determining the number of the one or more first processors; and performing, based on a frequency of the access to the shared memory from the plurality of processors, a consistency control in response to the access to the shared memory from the one or more second processors, the number of the one or more second processors being excluded the determined number of the one or more first processors from the plurality of processors, by performing a first consistency control or a second consistency control, the first consistency control being performed by software executed by the one or more second processors, and the second consistency control being performed by one of the one or more first processors according to a command issued by the one or more second processors.

7. The computer-implemented memory access control method according to claim 6, wherein the performing of the consistency control in response to the access from the one or more second processors comprises selecting the first consistency control or the second consistency control based on a result of a comparison between an access latency from the plurality of processors to the shared memory in response to the first consistency control being performed and an access latency from the plurality of processors to the shared memory in response to the second consistency control being performed.

8. The computer-implemented memory access control method according to claim 6, wherein the first consistency control comprises:

setting, by the one or more second processors, information about a cache status in management information stored in a given storage area of the shared memory; and performing, by the one of the one or more first processors, the consistency control by referring to the management information in response to accessing the shared memory.

9. The computer-implemented memory access control method according to claim 6, wherein the second consistency control comprises:

issuing, by the one or more second processors, a command to the one of the one or more the first processors to instruct an access to the shared memory; and executing the command by the one of the one or more first processors to cause the hardware to control the consistency of data in response to the access instructed in the executed command.

10. The computer-implemented memory access control method according to claim 6, wherein each of the plurality of processors executes a program allocated to one or more processors of the plurality of processors, and the determining of the number of the one or more first processors comprises determining the number of processors to operate as the one or more first processors from one or more processors executing a process for each of a plurality of the programs such that access latencies to the shared memory from each of the plurality of programs executed by the plurality of processors meet a given condition among the plurality of programs.

11. An information processing apparatus comprising:

a memory; and a processor coupled to the memory, the processor being configured to perform a process comprising:

upon controlling a consistency of data in response to an access from each of a plurality of processors comprising the processor to a shared memory comprising a storage area shared among the plurality of processors, the plurality of processors including one or more first processors for which the consistency is controlled by hardware and one or more second processors for which the consistency is controlled by software, determining the number of the one or more first processors; and performing, based on a frequency of the access to the shared memory from the plurality of processors, a consistency control in response to the access to the shared memory from the one or more second processors, the number of the one or more second processors being excluded the determined number of the one or more first processors from the plurality of processors, by performing a first consistency control or a second consistency control, the first consistency control being performed by software executed by the one or more second processors, and the second consistency control being performed by one of the one or more first processors according to a command issued by the one or more second processors.

12. The information processing apparatus according to claim 11, wherein in the performing of the consistency control in response to the access from the one or more second processors, the processor is configured to select the first consistency control or the second consistency control based on a result of a comparison between an access latency from the plurality of processors to the shared memory in response to the first consistency control being performed and an access latency from the plurality of processors to the shared memory in response to the second consistency control being performed.

13. The information processing apparatus according to claim 11, wherein the first consistency control comprises:

setting, by the one or more second processors, information about a cache status in management information stored in a given storage area of the shared memory; and performing, by the one of the one or more first processors, the consistency control by referring to the management information in response to accessing the shared memory.

14. The information processing apparatus according to claim 11, wherein the second consistency control comprises:

issuing, by the one or more second processors, a command to the one of the one or more first processors to instruct an access to the shared memory; and executing the command by the one of the one or more first processors to cause the hardware to control the consistency of data in response to the access instructed in the executed command.

15. The information processing apparatus according to claim 11, wherein each of the plurality of processors executes a program allocated to one or more processors of the plurality of processors, and in the determining of the number of the one or more first processors, the processor is configured to determine the number of processors to operate as the one or more first processors from one or more processors executing a process for each of a plurality of the programs such that access latencies to the shared memory from each of the plurality of programs executed by the plurality of processors meet a given condition among the plurality of programs.

* * * * *